United States Patent [19]
Kubosaki

[11] Patent Number: 5,697,254
[45] Date of Patent: Dec. 16, 1997

[54] TRANSMISSION SHIFT LEVER SUPPORT STRUCTURE

[75] Inventor: Takahiro Kubosaki, Hiroshima-ken, Japan

[73] Assignee: Delta Kogyo Co., Ltd., Hiroshima-ken, Japan

[21] Appl. No.: 650,904

[22] Filed: May 17, 1996

[30]     Foreign Application Priority Data

Aug. 23, 1995  [JP]  Japan ................................. 7-237732

[51] Int. Cl.⁶ ............................................. B60K 20/02
[52] U.S. Cl. ........................... 74/473 R; 74/475; 74/538; 403/353
[58] Field of Search ....................... 74/473 R, 475, 74/538; 403/150, 154, 160, 353; 29/434

[56]             References Cited

U.S. PATENT DOCUMENTS

| | | | |
|---|---|---|---|
| 3,796,503 | 3/1974 | Dawson | 403/353 |
| 4,242,014 | 12/1980 | Plevak et al. | 403/353 |
| 4,876,948 | 10/1989 | Yasukawa et al. | 403/150 |
| 5,497,673 | 3/1996 | Kataumi et al. | 74/473 R |

*Primary Examiner*—Charles A. Marmor
*Assistant Examiner*—Troy Grabow
*Attorney, Agent, or Firm*—Wenderoth, Lind & Ponack

[57] ABSTRACT

A shift lever support structure for an automatic transmission includes a T-shaped shift lever having a transverse boss, and a U-sectioned lever mount having first and second bearing holes defined in opposite side walls thereof for rotatably supporting first and second opposite ends of the transverse boss. The first bearing hole is elongated so as to have opposite straight side edges and opposite round ends continued with each other through the straight side edges, said round ends being spaced a distance sufficient to facilitate mounting of the transverse boss on the lever mount. A first stopper is disposed in the lever mount for restricting a radial displacement of the first end of the transverse boss within the first bearing hole which would result from the first bearing hole oversized relative to the diameter of the transverse boss. Second and third stoppers of a similar structure are also disposed in the lever mount on respective sides of the gear shift lever for restricting an axial displacement of the transverse boss in cooperation with the gear shift lever.

3 Claims, 4 Drawing Sheets

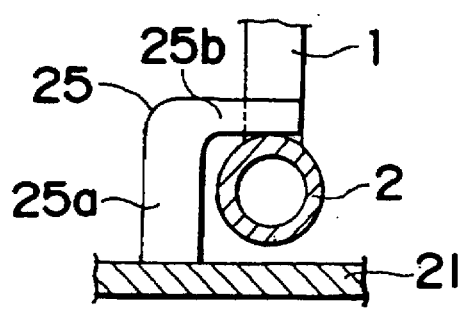
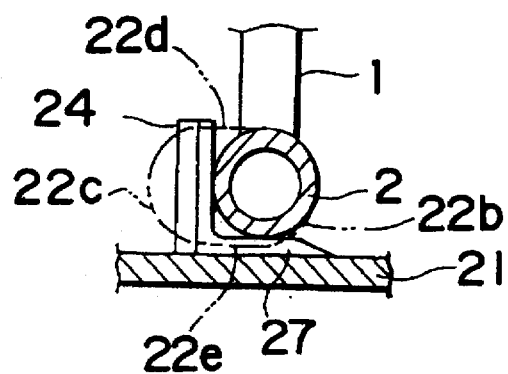
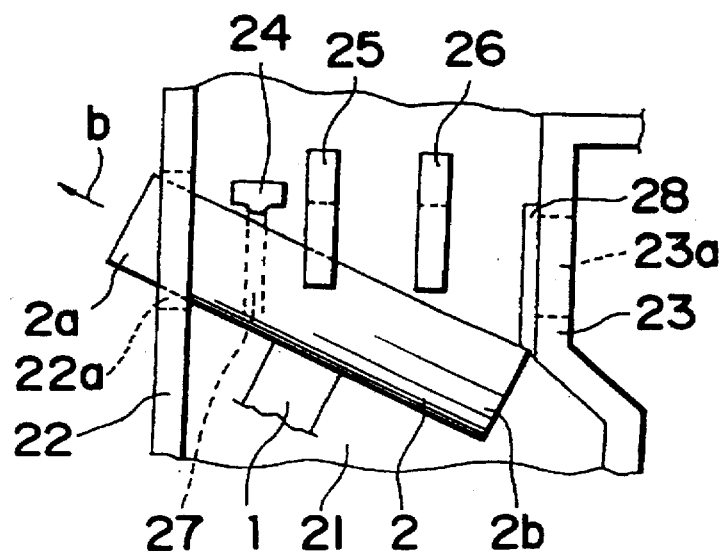

5,697,254

1

TRANSMISSION SHIFT LEVER SUPPORT STRUCTURE

BACKGROUND OF THE INVENTION

1. Field of the Invention

The present invention relates generally to a transmission mechanism used on an automotive vehicle and, more particularly, to a shift lever support structure for an automatic transmission mechanism.

2. Description of Related Art

In modern automotive vehicles, the automatic transmission is very popular and is provided with a gear shift lever selectively manipulatable over a predetermined stroke to one of, for example, "P" (for parking), "R" (for reversing), "N" (for neutral), "D" (for starting and cruising), "S" (for moderate inclines) and "L" (for steep inclines) positions to set the transmission in a respective gear range. This gear shift lever is generally supported for linear movement in a fore-and-aft direction.

FIG. 4 illustrates a shift lever support structure for supporting the gear shift lever currently employed in some automotive vehicles. According to the prior art shift lever support structure, the shift lever shown therein includes a tubular shaft 1 having a lower end connected rigidly to, or otherwise integrally formed with, a tubular transverse boss 2 so as to extend substantially perpendicular thereto, and an upper end having a buttoned grip 3 nondetachably mounted thereon. The button on the grip 3 is operatively coupled with a stop pin 4 protruding laterally outwardly from a generally intermediate portion of the shaft 1 and movable up and down over a limited distance along the shaft 1 in driving association with manipulation of the button on the grip 3. As is well known to those skilled in the art, the stop pin 4 may be operatively coupled with the button on the grip 3 by means of a spring-biased cable extending within the shaft 1 and the stop pin 4 is therefore normally biased upwardly as viewed therein.

A carrier plate 5 in the form of a leaf spring is mounted on a portion of the shaft 1 adjacent the stop pin 4 and has one end secured thereto and the opposite end carrying a roller 6 that is normally urged downwardly, as viewed in FIG. 4, by the resiliency of the carrier plate 5.

The shift lever support structure includes a lever mount, generally identified by 7, for the support of the shift lever in a manner that permits the shift lever to be angularly moved over the predetermined stroke to assume one of the gear positions about the longitudinal axis of the transverse boss 2. The lever mount 7 includes a generally rectangular base plate 8 having a correspondingly shaped opening 8a defined therein, bearing lugs 9a and 9c depending from the base plate 8 in a direction opposite to the shaft 1 and positioned on respective sides of the rectangular opening 8a so as to align with each other, and a generally strip-like arcuate guide plate 10 having opposite ends rigidly secured to the base plate 8 and positioned on one side of the base plate 8 opposite to the bearing lugs 9a and 9c so as to lie in a plane generally perpendicular to the plane of the base plate 8.

The bearing lugs 9a and 9c have respective holes 9b and 9d defined therein and are so positioned relative to each other with the holes 9b and 9d aligned with each other. As best shown in FIG. 5A, a spindle 11 having a head 11a and an externally threaded end 11b opposite to the head 11a is inserted through the hole 9d in the bearing lug 9c, then through a hollow 2a in the tubular transverse boss 2 and finally through the hole 9b in the bearing lug 9a before a nut

2

12 is firmly mounted on the externally threaded end 11b. In this way, the shaft 1 is supported by the lever mount 7 for angular movement over the predetermined stroke about the longitudinal axis of the spindle 11.

The strip-like arcuate guide plate 10 has first and second side edges 10a and 10b opposite to each other with the first side edge 10a facing towards the opening 8a in the base plate 8. The first side edge 10a is formed with a series of positioning recesses in which the stop pin 4 is selectively engageable to set the transmission in a selected one of the gear ranges. On the other hand, the second side edge 10b of the guide plate 10 is formed with a plurality of detent recesses in which the downwardly biased roller 6 is selectively engageable to provide a clicking sensation to the driver during manipulation of the gear shift lever so that the driver accustomed to the particular gear shift lever can ascertain the position of the gear shift lever without substantially permitting him or her to look at it.

Thus, in the assembled condition of the prior art shift lever support structure, the gear shift lever is pivotable between the extreme positions opposite to each other with the transverse boss 2 rotating relative to the spindle 11. Although not shown, the angular movement of the shift lever is transmitted to any known transmission control by means of, for example, a cable or a mechanical linkage system having one end coupled to the shaft, particularly a portion of the shaft between the transverse boss 2 and the carrier plate 5. In such case, the lever mount 7 is fixedly mounted on a portion of the automobile chassis or the like and the entire component parts except for the grip end of the shaft 1 are concealed by, for example, a floor-mounted cover or casing.

In a variant of the shift lever support structure discussed above, instead of the spindle 11 having the head 11a and the externally threaded end 11b in combination with the nut 12 shown in FIG. 5A, the spindle 11 having the head 11a and a reduced-diameter end 11c in combination with a quick snap-on washer 13 such as a speed nut or an E-ring washer is often used. Even in this case, the spindle 11 shown in FIG. 5B is inserted and set in position to support the gear shift lever in a manner similar to that described with reference to FIG. 5A.

In any event, with the prior art shift lever support structure discussed above, the number of the separate and independent component parts such as, for example, the spindle 11 and the nut 12 or washer 13 is relatively large. In addition, assemblage is relatively complicated, requiring a process of aligning and inserting the spindle 11 through the holes in succession and a process of fastening the nut or washer, in combination with the use of dedicated jigs and tools including, for example, a torque wrench. The increased number of the component parts, the complicated assembling procedure and the use of the special jigs and tools altogether constitute a major factor that results in an increase in manufacturing cost.

Moreover, there is another problem in that, once an attendant worker forgets or fails to fasten the nut or washer firmly, the quality of the transmission control system as a whole would be reduced.

SUMMARY OF THE INVENTION

Accordingly, the present invention has been devised with a view to substantially eliminating the above disadvantages and inconveniences inherent in the prior art shift lever support structure and is intended to provide an improved shift lever support structure of a simplified, but reliable type which does not require the use of such spindle and nut or washer hitherto required in the prior art shift lever support structure.

Another important objective of the present invention is to provide an improved shift lever support structure of the type referred to above, which can be manufactured at a reduced cost and which can be assembled without any need for attention to the possibility that the nut or washer may be insufficiently fastened.

In accomplishing the above and other objectives, the present invention provides a shift lever support structure for an automatic transmission for operatively supporting the gear shift lever in a manner that permits the shift lever to be angularly moved over the predetermined stroke to assume one of the gear positions. The shift lever is of a type including a shaft having one end rigidly connected or integrally formed with a transverse boss extending generally perpendicular to the shaft and having first and second ends opposite to each other. The shift lever support structure includes a generally U-sectioned lever mount comprised of a base plate having opposite side edges, and first and second side walls connected to the side edges of the base plate, respectively, so as to lie perpendicular to the base plate. The first and second side walls have first and second bearing holes defined therein for rotatably receiving the first and second ends of the transverse boss, respectively. The first bearing hole is elongated so as to have opposite straight side edges and opposite round ends continued with each other through the straight side edges.

A first stopper means is mounted on the base plate for restricting a radial displacement of the first end of the transverse boss within the first bearing hole, and second and third stopper means of a similar structure are also mounted on the base plate on respective sides of the shaft for restricting an axial displacement of the transverse boss in cooperation with the shaft.

In this structure, while the shaft of the shift lever is held flat against the base plate, the transverse boss is placed slantwise on the base plate at a location forwardly of the first to third stopper means with the first end thereof subsequently inserted into the first bearing hole by axially pushing the transverse boss until the second end of the transverse boss comes to be accommodated inside the side wall 23. Insertion of that first boss end into and through the first bearing hole is possible because the first bearing hole has a length sufficient to allow the transverse boss to be passed slantwise therethrough.

Thus, with no need to use such spindle and nut or washer in combination with such jigs and tools hitherto required in the prior art shift lever support structure, the gear shift lever can easily and quickly be mounted on the lever mount.

Preferably, the first bearing hole in the first side wall is oversized relative to the second bearing hole in the second side wall such that, when the first end of the transverse boss is received in said first beating hole, a gap is formed generally between one of the straight side edges and a portion of an outer peripheral surface of the transverse boss confronting such one of the straight side edges. The presence of the gap facilitates a quick and smooth insertion of that boss end with no skill required.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein:

FIG. 2B is a schematic cross-sectional view taken along the line IIB—IIB in FIG. 2A;

FIG. 2C is a schematic cross-sectional view taken along the line IIC—IIC in FIG. 2A;

FIGS. 3A to 3C are views similar to FIG. 2A, showing the sequence of mounting of the gear shift lever relative to the shift lever support structure according to the present invention;

DETAILED DESCRIPTION OF THE PREFERRED EMBODIMENTS

Figure 1:
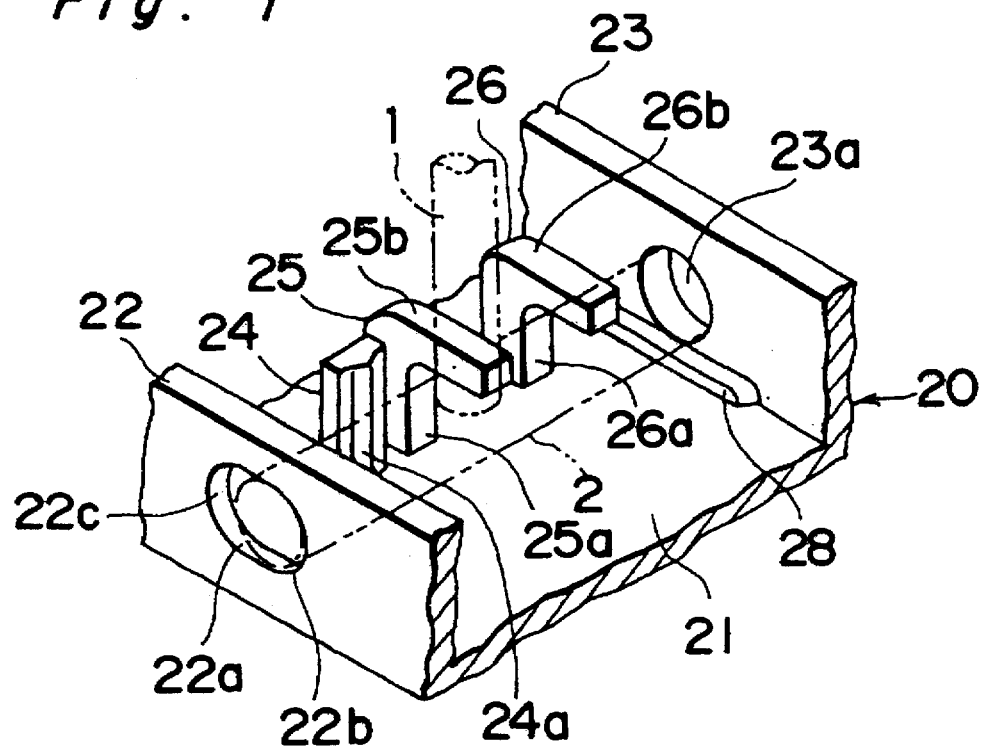
FIG. 1 is a fragmentary perspective view of a shift lever support structure according to the present invention.
Figure 2A:
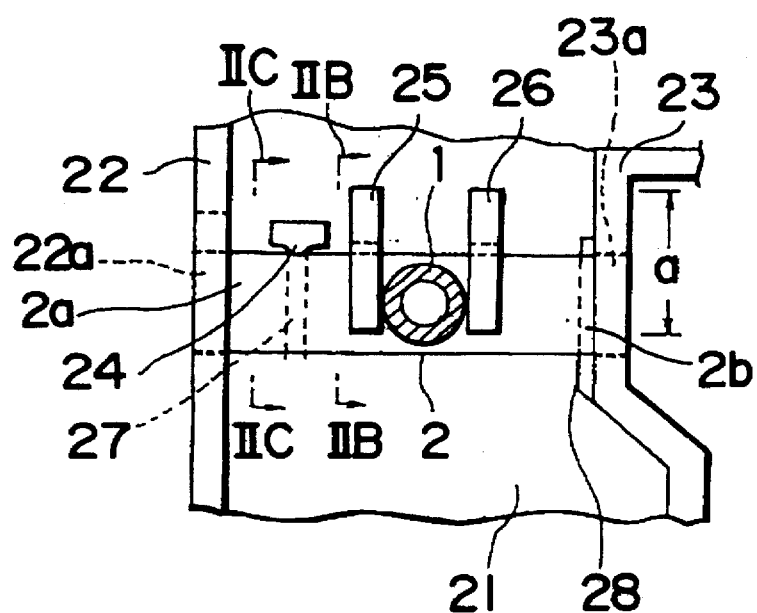
FIG. 2A is a schematic top plan view of the shift lever support structure with a gear shift lever mounted.
Figure 4:
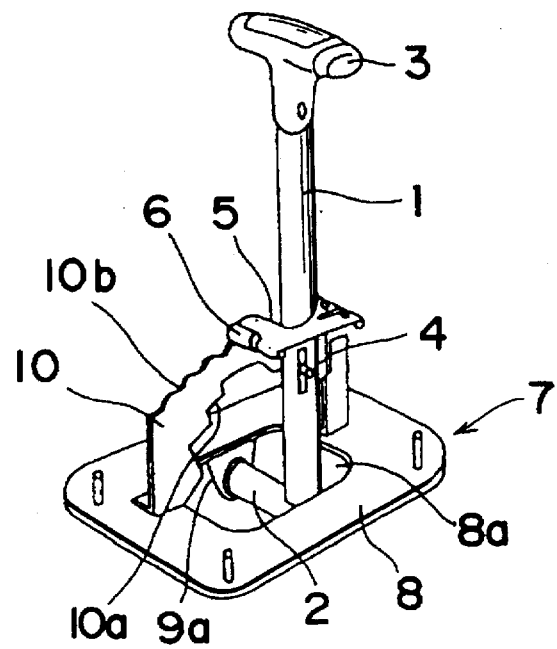
FIG. 4 is a schematic perspective view of the prior art shift lever support structure.
Figure 5A:
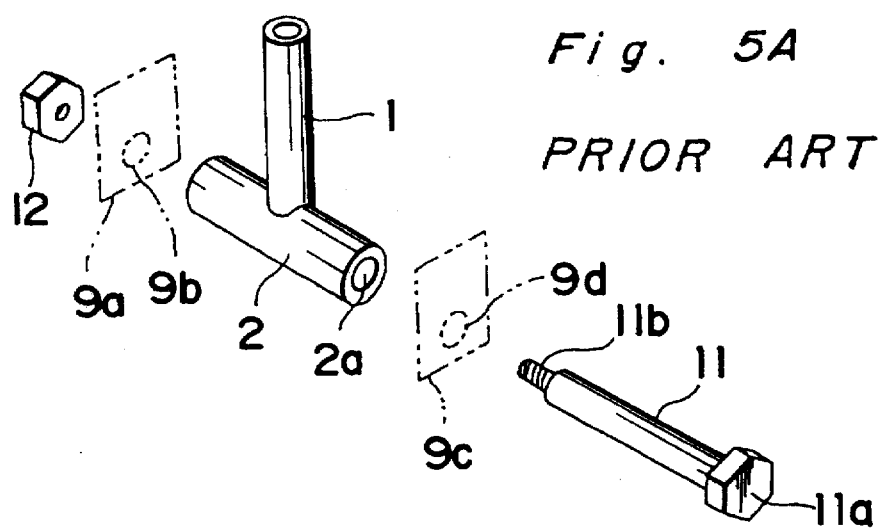
FIG. 5A is a schematic perspective view showing how the gear shift lever used in the prior art shift lever support structure is supported.
Figure 5B:
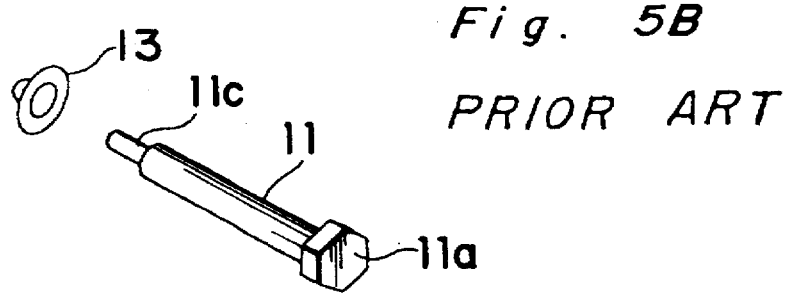
FIG. 5B is a schematic perspective view showing an alternative form of the spindle used in the prior art shift lever support structure.

Referring first to FIGS. 1 and 2A, the gear shift lever, including the strip-shaped guide plate, used in conjunction with the shift lever support structure of the present invention is substantially identical with that shown in FIG. 4. Specifically, while in the prior art shift lever support structure the transverse boss 2 rigid or integral with the shaft 1 must have the hollow 2a for passage of the spindle 11 therethrough, the transverse boss 11 used in conjunction with the shift lever support structure of the present invention may be in the form of either a tubular bar or a solid bar, although the tubular bar is preferred for, inter alia, its bending strength and light-weight feature.

The shift lever support structure embodying the present invention comprises a generally U-sectioned lever mount 20 of one-piece structure and made of moldable hard synthetic resin. The U-sectioned lever mount 20 includes a base plate 21 and first and second side walls 22 and 23 spaced a distance from each other in a widthwise direction of the base plate 21 and upstanding from respective opposite side edges of the base plate 21 so as to lie perpendicular to the base plate 21. The first and second side walls 22 and 23 are formed with bearing holes 22a and 23a defined therein, respectively, in face-to-face relation with each other.

For the reason which will become clear from the subsequent description, while the second beating hole 23a in the side wall 23 is of a round shape having a diameter substantially equal to the outer diameter of the transverse boss 2, the first bearing hole 22a is of a generally elongated slot-like shape having, as best shown by a phantom line in FIG. 2C, opposite rounded ends 22b and 22c continued together through upper and lower straight side edges 22d and 22e and having respective centers of curvature that are spaced a distance from each other along the lengthwise direction of the side wall 22. Although the present invention may work satisfactory even though the radius of curvature of the rounded end 22b is substantially equal to half the outer diameter of the transverse boss 2 and/or greater than that of the other rounded end 22c, the illustrated embodiment employs the first bearing hole 22a having the opposite rounded ends 22b and 22c each having an equal radius of curvature which is slightly greater than the radius of curvature of the second bearing hole 23a. Also for the reason which will become clear from the subsequent description, the first and second bearing holes 22a and 23a are so positioned relative to each other that when opposite ends 2a and 2b of the transverse boss 2 are rotatably received within the first and second bearing holes 22a and 23a, the transverse boss 2 extends perpendicular to any one of the side walls 22 and 23 and parallel to the base plate 21 and, at the same time, the end 2a of the transverse boss 2 received within the first bearing hole 22a slidingly contacts the rounded end 22b thereof while leaving a gap generally below that end 2a of the transverse boss 2 and above the lower side edge 22e of the first bearing hole 22a as clearly shown in FIG. 2C. In other words, the center of curvature of the rounded end 22b of the first beating hole 22a may, as dearly shown in FIG. 2C, be positioned at a level slightly lower than that of the second bearing hole 23a.

The first and second side walls 22 and 23 supports the gear shift lever with the opposite ends of the transverse boss 2 rotatably received respectively in the first and second bearing holes 22a and 23a in the associated side walls 22 and 23 as shown by a phantom line in FIG. 1 and by a solid line in FIG. 2A. In the assembled condition, hence, as the gear shift lever is angularly moved over the predetermined stroke between the extreme positions, the shaft 1 undergoes an angular movement about the longitudinal axis of the transverse boss 2 in a plane parallel to and intermediate between the side walls 22 and 23 and perpendicular to the base plate 21.

To set the transverse boss 2 in position between the first and second side walls 22 and 23 with its opposite ends received in the first and second bearing holes 22a and 23a, the base plate 21 has first to third stoppers 24, 25 and 26 formed integrally therewith, or otherwise rigidly mounted thereon, at respective locations which are, in the assembled condition, on one side of the transverse boss 2. The first and third stoppers 24 and 26 are positioned adjacent the side wall 22 and 23, respectively, with the second stopper 25 positioned generally intermediate therebetween.

The first stopper 24 is in the form of a generally straight bar upstanding from the base plate 21 and serves to avoid a play of that end 2a of the transverse boss 2 received within the first bearing hole 22a which would result from the first bearing hole 22a being oversized relative to the second bearing hole 23a and, hence, the outer diameter of that end 2a of the transverse boss 2 as hereinabove discussed. This first stopper 24 has one surface facing the transverse boss 2 formed with a longitudinal ridge 24a that is, in the assembled condition, engaged with the outer peripheral surface of the transverse boss 2 to define a point of contact between it and the transverse boss 2. The use of the longitudinal ridge 24a, that is, the presence of the point contact, although not essential in the practice of the present invention, is advantageous to minimize the frictional resistance developed between the transverse boss 2 and the first stopper 24 during selective rotation of the gear shift lever. The longitudinal ridge 24a can readily be obtained if the first stopper 24 is employed in the form of the bar having a generally triangular cross-section or a semicircular cross-section.

Each of the second and third stoppers 25 and 26 is in the form of a generally inverted L-shaped bar having a leg 25a or 26a upstanding from the base plate 21 and a transverse arm 25b or 26b perpendicular to the respective leg 25a or 26a. In the assembled condition, the second and third stoppers 25 and 26 are so positioned on the base plate 21 with the respective transverse arms 25b and 26b protruding from the associated legs 25a and 26a a distance, indicated by (a) in FIG. 2A, sufficient to override the transverse boss 2 as shown in FIG. 2B to thereby avoid any possible separation of the transverse boss 2 and, at the same time, are spaced from each other a distance sufficient to accommodate the outer diameter of the shaft 1 therebetween as shown in FIG. 2A to thereby prevent the transverse boss 2 from undergoing an axial displacement.

It should be noted that the first stopper 24 may not be always necessary and may be dispensed with. In such case, the respective legs 25a and 26a of the second and third stoppers 25 and 26 serve the purpose of avoiding a play of that end 2a of the transverse boss 2 received within the first bearing hole 22a which would result from the first bearing hole 22a being oversized relative to the outer diameter of that end 2a of the transverse boss 2 as hereinabove discussed. Nevertheless, each of the legs 25a and 26b may be formed with a respective ridge structurally and functionally similar to the ridge 24a discussed above in connection with the first stopper 24.

Although not necessarily essential in the practice of the present invention, first and second elongated guide ribs 27 and 28 for the support of the opposite end portions of the transverse boss 2 from below and also for facilitating mounting of the gear shift lever as will be described later are formed integrally with, or otherwise mounted fixedly on, the base plate 21 in laterally spaced and parallel relation with each other. Specifically, the second elongated guide rib 28 is positioned on the base plate 21 at a corner region between the base plate 21 and the side wall 23 and below the second bearing hole 23a. Although the first elongated guide rib 27 may be similarly positioned at the opposite corner region between the base plate 21 and the side wall 22, in the illustrated embodiment the first elongated guide rib 27 is integrally formed with the first stopper 24 so as to be continued from the bottom thereof so as to extend underneath the transverse boss 2. The integrality of the first elongated guide rib 27 with the first stopper 24 is advantageous in that the first elongated guide rib 27 can be reinforced.

Preferably, each of the first and second guide ribs 27 and 28 has a longitudinal ridge defined therein in a fashion similar to the ridge 24a of the first stopper 24 to provide a similar point-contact between it and the outer peripheral surface of the transverse boss 2 to thereby minimize the frictional resistance which will be developed between it and the transverse boas 2 during rotation of the latter. Also, each of the first and second guide ribs 27 and 28 has one end positioned on one side of the transverse boss 2 opposite to the first to third stoppers 24 to 26 and inclined downwardly towards the base plate 21.

The manner in which the gear shift lever is mounted on the shift lever support structure will now be discussed with particular reference to FIGS. 3A to 3C.

In the first place, as shown in FIG. 3A, while the shaft 1 is held flat against the base plate 21, the transverse boss 2 is placed slantwise on the base plate 21 at a location forwardly of the first to third stoppers 24 to 26 as viewed therein, with the end 2a thereof subsequently inserted into the first bearing hole 22a by axially pushing the transverse boss 2 in a direction, shown by the arrow (b), until the opposite end 2b of the transverse boss 2 comes to be accommodated inside the side wall 23.

Insertion of that boss end 2a into and through the first bearing hole 22a is possible because the first bearing hole 22a has a length sufficient to allow the transverse boss 2 to be passed slantwise therethrough. In addition, because of the first bearing hole 22a is oversized relative to the outer diameter of the transverse boss 2 as discussed above, and also because the guide rib 24 has a height or thickness, as measured in a direction above the base plate 21, corresponding to the width as measured between a portion of the side wall 22 level with the inner surface of the base plate 21 and the lower side edge 22e of the first bearing hole 22a, a quick and smooth insertion of that boss end 2a is possible.

Figure 3B:
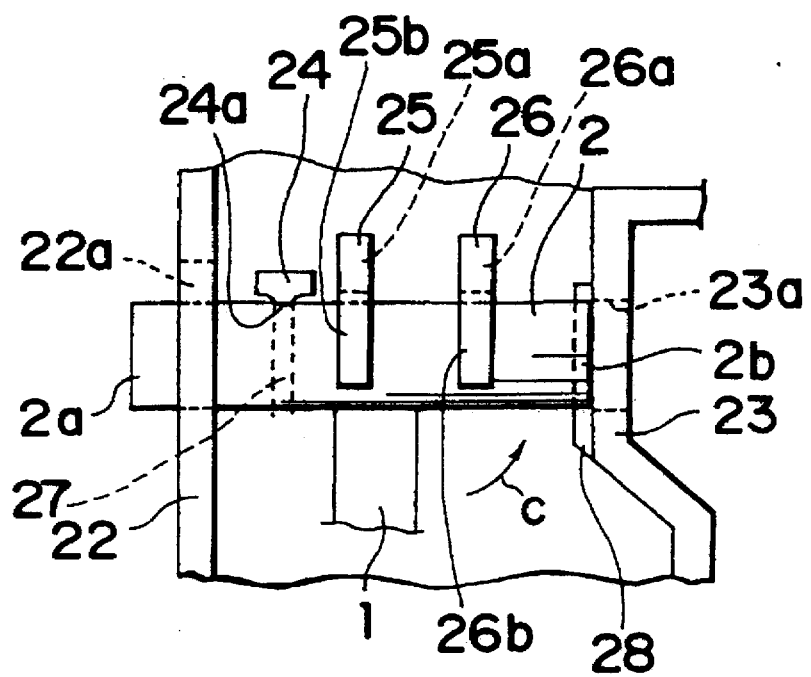

After the boss end 2a has been inserted slantwise into the first bearing hole 22a, the other end 2b of the transverse boss 2 is pushed or drawn towards the first to third stoppers 24 to 26 until the boss end 2b is aligned with the second bearing hole 23a in the side wall 23, as shown in FIG. 3B. As the transverse boss 2 is so pushed or drawn, the boss end 2b slidingly rides over the second guide rib 28 and is then brought into alignment with the second bearing hole 23a as shown therein with the transverse boss 2 having been pivoted about the point of contact between the longitudinal ridge 24a of the first stopper 24 and the outer peripheral surface thereof in a direction shown by the arrow (c) in FIG. 3B. At the same time, the transverse boss 2 is brought close to the respective legs 25a and 26a of the second and third stoppers 25 and 26 having passed underneath the respective transverse arms 25b and 26b.

Figure 3C:
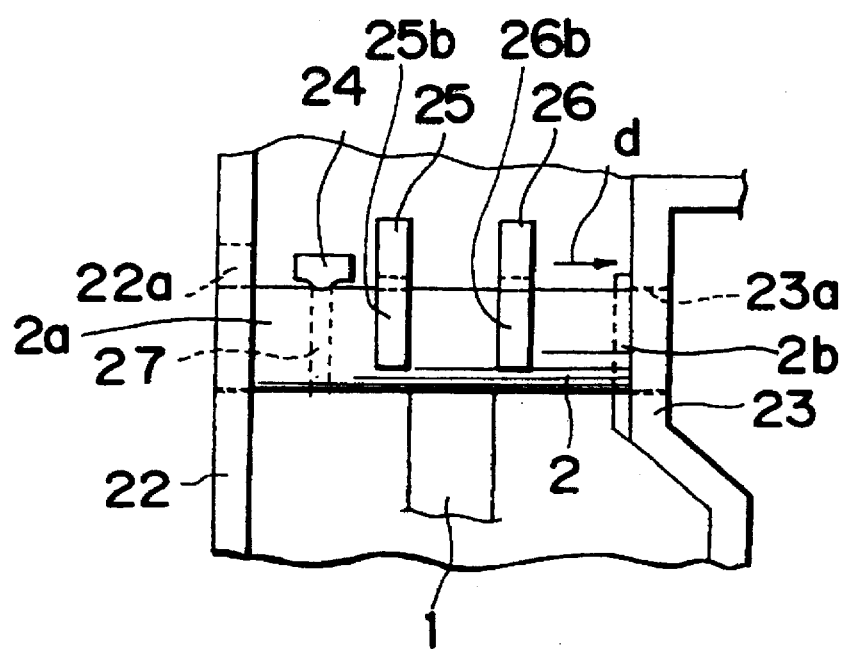

Subsequent to alignment of that boss end 2b with the second bearing hole 23a, the transverse boss 2 is moved axially in a direction shown by the arrow (d) in FIG. 3C and counter to the direction of insertion of the boss end 2a into the first bearing hole 22a, thereby allowing the boss end 2b to be inserted into the second bearing hole 23a, as shown in FIG. 3C. Thereafter, the shaft 1 is erected until it is received within the space between the second and third stoppers 25 and 26, thereby completing the mounting of the gear shift lever on the shift lever support structure.

Thus, in the assembled condition, while any possible radial displacement of the boss end 2b is restricted by the wall defining the second bearing hole 23a since the second bearing hole 23a has a diameter substantially equal to the outer diameter of the transverse boss 2, any possible radial displacement of the boss end 2a can advantageously be restricted by an upper curved portion of the wall defining the round end 22b of the first bearing hole 22a, the first stopper 24 and the first guide rib 27. An undesirable axial displacement of the transverse boss 2 is, of course, restricted by the transverse arms 25b and 26b positioned on respective sides of the shaft 1.

As is the case with the prior art shift lever support structure, the angular movement of the shaft 1 and, hence, the shift lever is transmitted to any known transmission control by means of, for example, a cable or a mechanical linkage system having one end coupled to the shaft 1, particularly a portion of the shaft between the transverse boss 2 and the carrier plate 5. In such case, the lever mount 20 is fixedly mounted on a portion of the automobile chassis or the like and the entire component parts except for the grip end of the shaft 1 are concealed by, for example, a floor-mounted cover or casing. Once the shift lever support structure is installed, the shaft 1 will no longer be laid flat against the base plate 21 since that portion of, for example, the floor-mounted cover or casing where the shaft 1 loosely extend through is provided with any known means for regulating the stroke of movement of the gear shift lever.

From the foregoing description, it has now become clear that the shift lever support structure constructed according to the teachings of the present invention does not require any combination of a spindle and a nut or washer in combination with the use of the special jigs and tools, such as required in the prior art shift lever support structure.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A shift lever support structure for an automatic transmission, which comprises:

a generally T-shaped shift lever including a shaft and a transverse boss perpendicular to the shaft, said transverse boss having first and second ends opposite to each other;

a generally U-sectioned lever mount including a base plate having opposite side edges, and first and second side walls connected to the side edges of the base plate, respectively, so as to lie perpendicular to the base plate, said first and second side walls having first and second bearing holes defined therein for rotatably receiving the first and second ends of the transverse boss, respectively, said first bearing hole being elongated so as to have opposite straight side edges and opposite round ends continued with each other through the straight side edges;

a first stopper means mounted on the base plate for restricting a radial displacement of the first end of the transverse boss within the first bearing hole; and second and third stopper means of a similar structure mounted on the base plate on respective sides of the shaft for restricting an axial displacement of the transverse boss in cooperation with the shaft.

2. The shift lever support structure according to claim 1, wherein said first bearing hole in said first side wall is oversized relative to the second bearing hole in the second side wall such that, when the first end of the transverse boss is received in said first bearing hole, a gap is formed generally between one of the straight side edges and a portion of an outer peripheral surface of the transverse boss confronting such one of the straight side edges.

3. The shift lever support structure according to claim 2, further comprising at least one guide rib fixedly disposed on the base plate so as to extend substantially perpendicular to the transverse boss, said transverse boss when mounted on the lever mount with the first and second ends thereof received within the first and second bearing holes, having the first end supported from below by said guide rib to thereby avoid a radial downward displacement of the first end of the transverse boss.

* * * * *